United States Patent
Nelson et al.

(10) Patent No.: US 6,190,757 B1
(45) Date of Patent: Feb. 20, 2001

(54) COMPOSITIONS AND THERMAL MASS TRANSFER DONOR ELEMENTS FOR USE IN PRODUCING SIGNAGE ARTICLES

(75) Inventors: Lisa Flatt Nelson, Inver Grove Heights; Hsin-Hsin Chou, Woodbury; Christopher E. Kunze, Highland Park, all of MN (US)

(73) Assignee: 3M Innovative Properties Company, St. Paul, MN (US)

( * ) Notice: Under 35 U.S.C. 154(b), the term of this patent shall be extended for 0 days.

(21) Appl. No.: 08/386,279

(22) Filed: Feb. 9, 1995

(51) Int. Cl.[7] .................................................. B41M 5/40
(52) U.S. Cl. ............................. 428/195; 40/612; 116/63; 359/584; 428/484; 428/500; 428/913; 428/914
(58) Field of Search ...................... 428/195, 207, 428/484, 488.1, 488.4, 500, 913, 914; 40/612; 116/63; 359/584

(56) References Cited

U.S. PATENT DOCUMENTS

| | | | |
|---|---|---|---|
| 2,407,680 | * | 9/1946 | Palmaquist et al. .................... 88/82 |
| 3,190,178 | * | 6/1965 | McKenzie ................................ 88/82 |
| 3,648,348 | * | 3/1972 | Freimuth .......................... 29/200 B |
| 4,025,159 | * | 5/1977 | McGrath ............................. 350/105 |
| 4,801,193 | * | 1/1989 | Martin ................................. 350/103 |
| 4,818,591 | | 4/1989 | Kitamura et al. .................... 428/216 |
| 4,839,224 | * | 6/1989 | Chou et al. .......................... 428/323 |
| 4,894,288 | * | 1/1990 | Fukuda et al. ...................... 428/422 |
| 4,895,428 | * | 1/1990 | Nelson et al. ...................... 350/103 |
| 4,896,943 | * | 1/1990 | Toliver et al. ...................... 350/105 |
| 4,938,563 | * | 7/1990 | Nelson et al. ...................... 350/103 |
| 4,985,321 | * | 1/1991 | Chou et al. ............................ 430/38 |
| 5,053,267 | * | 10/1991 | Ide et al. .............................. 428/195 |
| 5,064,272 | * | 11/1991 | Bailey et al. ........................ 359/541 |
| 5,066,098 | * | 11/1991 | Kult et al. ........................... 359/540 |
| 5,089,362 | * | 2/1992 | Chou et al. ............................ 430/16 |
| 5,139,598 | * | 8/1992 | Chou et al. .......................... 156/234 |
| 5,175,055 | * | 12/1992 | Tsukahara et al. ................... 428/212 |
| 5,223,328 | * | 6/1993 | Ito et al. .............................. 428/195 |
| 5,236,739 | * | 8/1993 | Chou et al. .......................... 427/146 |
| 5,320,898 | | 6/1994 | Yoshida et al. ...................... 428/195 |
| 5,393,590 | * | 2/1995 | Caspari ................................ 428/195 |
| 5,427,840 | * | 6/1995 | Imamura et al. .................... 428/195 |

FOREIGN PATENT DOCUMENTS

| | | | |
|---|---|---|---|
| 3634049 A1 | | 4/1987 | (DE) .................................... 428/195 |
| 43 13 519 A1 | * | 10/1994 | (DE) .................................... 428/195 |
| WO 94/19710 | * | 9/1994 | (WO) . |
| WO 94/19769 | * | 9/1994 | (WO) . |

OTHER PUBLICATIONS

ASTM G 26–93, Operating Light–Exposure Apparatus (Xenon–Arc Type) With and Without Water for Exposure of Nonmetallic Materials. pp. 1096–1104.*
ASTM E 810–81, Coefficient of Retroreflection of Retroreflective Sheeting, pp. 294–297.*
ASTM E 809–91, Measuring Photometric Characteristics of Retroreflectors, pp. 286–293.*
ASTM E–808–81, Describing Retroreflection, pp. 283–285.*
Poly Emulsion 330 N35 Technical Data Sheet, Chemical Corporation of America, dated May 1, 1990.*
Niche Markets for Non–Impact Printing Technologies by Arthur Diamond, Diamond Research Corporation, dated 1994, pp. 14–18.*
Carboset Product Guide, by BF Goodrich, (Specialty Polymers & Chemicals Division), dated Jun. 1989.*

* cited by examiner

*Primary Examiner*—Bruce H. Hess
(74) *Attorney, Agent, or Firm*—Doreen S. L. Gwin

(57) ABSTRACT

Coatable thermal mass transfer precursor compositions, suitable for producing thermal mass transfer donor elements, are described, the coatable compositions comprising a polyalkylene binder precursor; an acrylic binder precursor; an effective amount of a pigment to provide the desired color to a thermal mass transfer composition using the coatable composition; and d) a diluent (preferably water) in which the polyalkylene binder precursor, acrylic binder precursor, and pigment are all dispersed therein. Signage articles produced using the donor elements are also described.

10 Claims, 1 Drawing Sheet

COMPOSITIONS AND THERMAL MASS TRANSFER DONOR ELEMENTS FOR USE IN PRODUCING SIGNAGE ARTICLES

BACKGROUND OF THE INVENTION

1. Field of the Invention

The present invention relates to thermal mass transfer compositions and articles for use in producing signage articles. In particular the present invention relates to the use of thermal mass transfer compositions which employ a binder which does not significantly absorb ultraviolet radiation, thereby avoiding substantial heat absorption and degradation of the binder, and including durable, stable pigments which do not exhibit significant color change or loss of brightness.

2. Related Art

Thermal mass transfer processes use a donor sheet (commonly denoted a "ribbon" or "foil") and a receptor sheet or substrate. The thermal mass transfer donor sheet normally comprises a carrier layer and a colorant layer with at least a thermally transferable colorant (a dye or preferably a pigment) in a heat softenable binder. The colorant layer typically consists of a pigment dispersed in a binder (the binder transferring with the pigment during thermal transfer). Thermal mass transfer sheets are used with the donor surface (colorant layer) in intimate contact with a receptor material, and the donor sheet is heated in an imagewise manner (e.g., by thermal printheads, irradiation as by a laser or high intensity radiation transmitted through a mask or stencil) to transfer the image forming material. In the thermal mass transfer system, the colorant layer is softened by the imagewise heating (and sometimes a receptor layer on the receptor sheet is contemporaneously softened), and the softened area is transferred to the receptor sheet. The ultimate use of the substrate having the transferred image thereon frequently dictates the durability requirements of the image.

Thermal mass transfer is useful for preparing outdoor durable signage articles, such as automobile registration tags which are adhered to license plates. See, for example, Patent Cooperation Treaty applications WO 94/19710 (claiming priority from U.S. Ser. Nos. 08/017,573 and 08/033,627) and WO 94/19769 (claiming priority from U.S. Ser. Nos. 08/017,573 and 08/033,625), both published Sep. 1, 1994. For the articles described therein, thermal mass transferred indicia was printed onto a specially formulated polyurethane "multifunction" layer, an attribute of which was to eliminate the need for a cover layer for resin-based binder printed indicia. Many commonly used binders employ large amounts of UV stabilizers and UV absorbers, which tend to produce heat in the binders and cause their early degradation, thereby decreasing brightness and/or increasing color change.

There is a need in the signage art, particularly those meant for outdoor usage, to be able to apply color images to many different substrates without loss of brightness or color change, and without having to use complex processes.

SUMMARY OF THE INVENTION

The present invention overcomes many deficiencies of the prior art in providing good quality, durable (i.e. minimal color change and minimal loss of brightness) thermal mass transfer images. The durability of thermal mass transfer images produced by the methods of the invention is improved by use of thermal mass transfer precursor compositions including dispersions of organic and/or inorganic pigments. As used herein, the term thermal mass transfer precursor composition means a coatable, film-forming composition (preferably aqueous) comprising binder precursors and pigments. Binder precursors are present in the coatable compositions, whereas the term binder means the solid remnants of the binder precursors. The term thermal mass transfer composition means a solid composition present either on an inventive donor element or as an image on a substrate.

In accordance with one aspect of the present invention, coatable, film-forming thermal mass transfer precursor compositions are described comprising:

a) a polyalkylene latex binder precursor;
b) an acrylic latex binder precursor;
c) an effective amount of a pigment to provide the desired color to a thermal mass transfer composition using the composition; and
d) a diluent (preferably water), in which the polyalkylene latex binder precursor, acrylic latex binder precursor, and pigment are all dispersed, wherein the pigment and the acrylic binder precursor are present at a weight ratio of pigment to acrylic binder precursor ranging from about 0.5:1.0 to about 1.5:1.0, and the polyalkylene latex binder precursor is present in an amount to provide the desired low UV and visible light transparency to the thermal mass transfer composition. It will be understood that optional ingredients such as emulsifiers, dispersing aids, surfactants and the like, will normally be included in commercial embodiments of the inventive coatable, film-forming compositions, as further described herein, as long as the resulting thermal mass transfer composition (other than pigments, dyes, or colorants) is substantially UV transparent.

The term polyalkylene not only includes polyethylene, polypropylene, polybutadiene, and the like, but also polyalkylene-like oligomers and polymers having a high percentage of methylene units, such as oligomeric compositions comprising the reaction product of a low molecular weight organic acid, such as acrylic acid, and a high molecular weight alcohol or short chain diol.

As used herein the term acrylic includes copolymers and terpolymers of an alkylene monomer and an acidic copolymerizable monomer. Examples of alkylene monomers include ethylene, propylene, and the like, and examples of acidic copolymerizable monomers include acrylic acid and alkylacrylic acids such as methacrylic acid, ethacrylic acid, and the like.

The term coatable means the compositions of the invention have viscosity no greater than 50 centipoise, measured using a Brookfield viscometer, #2 spindle, at room temperature (about 20° C.).

Another aspect of the invention is a thermal mass transfer donor element comprising a dried version of the inventive composition (i.e. a thermal mass transfer composition) adhered to a carrier, wherein the carrier is preferably a film, more preferably a polymeric film.

The compositions and donor elements of the invention may be used in conventional processes for providing a thermal mass transfer image on a substrate. Thus, another aspect of the invention is a signage article comprising a thermal mass transfer composition of the invention adhered to a substrate, thus forming a colorant layer. The thermal mass transfer processes used to produce these articles typically comprises the steps of placing the colorant layer of a thermal mass transfer donor element in contact with a second surface, and transferring at least a portion of the thermal mass transfer composition from the donor element to the second surface by heating at least a portion of the thermal mass transfer donor layer. Preferred substrates are paper, metal, and polymeric, with polymeric substrates particularly preferred, for example the polymeric surface of a retroreflective sheeting. Particularly preferred signage articles include outdoor durable signage such as highway signs, automobile registration validation stickers and window stickers, and license plates. The colorant layer of signage articles of the invention may be exposed or buried beneath one or more polymeric (particularly polymethylmethacrylate (PMMA)) or glass cover layers, but for uses where prolonged outdoor exposure is expected, a cover layer is particularly desirous.

The colorant layer thickness in articles of the invention is preferably from about 1 to about 10 micrometers, more preferably from about 2 to about 8 micrometers, and most preferably from about 3 to about 6 micrometers. The colorant layer (on both the thermal mass transfer donor elements and the signage articles of the invention) has a softening or melting temperature between 50° C. and 140° C., preferably from 60° C. and 120° C., more preferably from 65° C. and 110° C. and most preferably from 70° C. and 100° C.

In donor elements of the invention which employ a polymeric film carrier (preferably polyethylene terephthalate (PET)), the polymeric film preferably has a thickness ranging from about 1 to about 10 micrometers, more preferably from about 2 to about 6 micrometers In formulating the coatable, film-forming compositions of the invention it is important, particularly if transparent colors are desired in the signage articles of the invention, to prevent agglomeration of the pigment particles. Thus, another aspect of the invention is a method of formulating a coatable, film-forming composition, the composition suitable for use in producing a thermal mass transfer donor element, the method comprising the steps of:

a) adding water to a quantity of a pigment dispersion employing moderate agitation to form a first intermediate;

b) adding methanol to the first intermediate to form a second intermediate;

c) adding an acrylic dispersion to the second intermediate to form a third intermediate; and d) adding a polyalkylene emulsion to the third intermediate to form the coatable composition, wherein the amount of water and methanol is sufficient to afford the composition a weight percentage solids ranging from about 1 to about 20 weight percent, and the pigment dispersion, the acrylic latex, and the polyalkylene emulsion are present in weight ratio of about 1:1:4.

The invention will be more fully understood with reference to the following detailed description of the invention.

Figure 1:
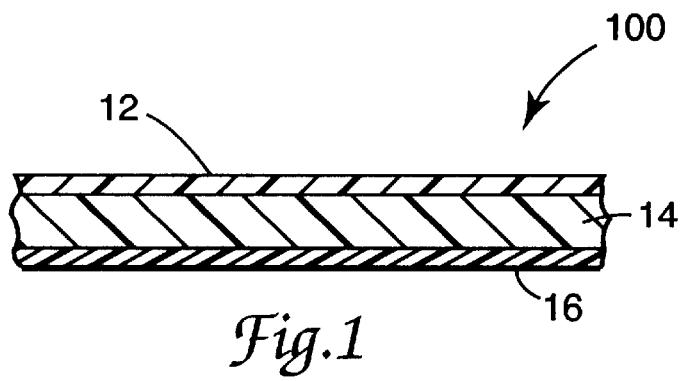
FIG. 1 is a cross-sectional view (enlarged) of an illustrative thermal mass transfer donor element in accordance with the present invention.

The figures are not to scale and are merely illustrative of the invention.

DESCRIPTION OF THE PREFERRED EMBODIMENTS

I. Coatable, Film-forming Thermal Mass Transfer Precursor Compositions

A. Binder Precursors and Binders

Thermoplastic acrylic latex binder precursors useful in the invention primarily function (in binder form) to provide the necessary adhesion of the thermal mass transfer composition to the substrate. The acrylic latex binder precursors also provide binders which retain their optical properties over prolonged time periods of exposure to outdoor conditions, especially when protected from abrasion via a plastic or glass cover layer. Tests for color change and brightness retention are included on the Test Methods Section. The acrylic latex binder precursors, after drying and film formation, also provide a high degree of water resistance for all substrates, and corrosion resistance for metal substrates.

Useful thermoplastic acrylic latex binder precursors are available as aqueous dispersions, typically and preferably having a percent solids ranging from about 10 to 80 weight percent, a pH ranging from about 6.0 to 8.0, an acid number ranging from about 30 to about 80, more preferably from about 60 to 80, a viscosity ranging from about 5 to about 500 centipoise measured at 25° C. using a Brookfield viscometer, #2 spindle, and glass transition temperature ranging from about 20 to about 70° C., more preferably from about 25 to about 60° C. Preferred acrylic film-forming aqueous dispersions are those known under the trade designations CARBOSET XL-11 and CARBOSET 514H, from BFGoodrich, Cleveland, Ohio, wherein the XL-11 version is 30 weight percent solids, and has a viscosity of 50 centipoise, a pH of 6.7, an acid number of 75, and glass transition temperature of 55° C., and the 514H version, which is 40 weight percent solids, has a viscosity of 350 centipoise, a pH of 7.0, an acid number of 65, and glass transition temperature of 28° C.

The polyalkylene binder precursor has the function (in binder form) of a wax-like component. Thermally mass transferred compositions of the invention preferably comprise at least one polyalkylene binder, typically and preferably derived from an aqueous film-forming dispersion comprising 0.01 to 5 micrometer solid particulate (preferably optically clear). Preferred polyalkylene binder precursors are micrometer-size particulates, and may include any transparent, fine solid polyalkylene particles that are not soluble and yet easily dispersible to form the coatable, film-forming thermal mass transfer precursor compositions of the invention. Polyethylene polymers having low differentials in their indices of refraction from acrylic binders are preferred. The low differential is preferred for refractive index matching in order to reduce the light scattering in the colorant layer.

Since the polyalkylene latex and acrylic latex binder precursors are immiscible, the minor component of the two (the acrylic binder) forms islands in the film formed by the major component (the polyalkylene binder). Therefore, the ratio of these two ingredients must be carefully optimized in the coatable, film-forming compositions of the invention to provide proper cohesiveness of the dried thermal mass transfer composition for high resolution imaging. Since both acrylic and polyalkylene binders are thermoplastic, they both contribute to the necessary adhesion to the receptor during thermal mass transfer printing.

The polyalkylene binder also functions like a wax-like material in that it assists in allowing the transferred image to conform to a rough surface, such as paper, or around and between glass beads in encapsulated lens retroreflective sheeting. The polyalkylene material and optional particulates also provide the benefit of reducing printer head energy input during the thermal mass transfer process.

The polyalkylene binder precursors are available as dispersions and emulsions having viscosities ranging from about 10 to about 70 centipoise, pH ranging from about 7 to 10, a percent solids ranging from about 10 to about 80 weight percent, and are typically and preferably clear and transparent.

One exemplary polyalkylene latex binder precursor is that known under the trade designation POLY EMULSION 330 N35, available from Chemical Corporation of America, East Rutherford, N.J., which is a 35 weight percent solids emulsion of the film-forming polyethylene latex known under the trade designation AC-330 from Allied Chemical Corporation. The emulsion has a nonionic charge, a viscosity of 50 centipoise maximum, a pH ranging from about 8.5 to about 9.5, and is clear and transparent.

To further reduce the cohesion of the colorant layer, non-film-forming, non-thermoplastic solid particulates may be employed. Preferred acrylic, non-film-forming particulates are 10 percent solids dispersion in deionized water of polymers of stearyl methacrylate hexane diol diacrylate, preferably present at a 1:1 weight ratio.

Other optional non-film-forming solid particulates may be preferred for tailoring higher resolution and lower imaging energy (i.e., the energy required to transfer the composition from the PET or other donor to the intended receptor). These include but are not limited to $TiO_2$, MgO, ZnO, $CaCO_3$, $SiO_2$, micas, and the like.

The inventive coatable, film-forming compositions preferably comprise from about 0.5:1.0 to about 1.5:1.0 weight ratio pigment dispersion to acrylic latex binder precursor dispersion, and a weight ratio of pigment dispersion to polyalkylene latex binder precursor dispersion ranging from about 0.1:1.0 to 0.33:1.0. In the thermal mass transfer compositions of the invention (solid) the weight ratio of pigment to acrylic binder ranges from about 0.5:1.0 to about 1.5:1.0, while the weight ratio of pigment to polyalkylene binder ranges from about 0.1:1.0 to about 0.33:1.0.

Preferably, the thermal mass transfer compositions of the invention have a melting point (mp) or softening point (sp) ranging from about 50° to about 140° C. to enhance the thermal mass transfer efficiency. Melting points below about 50° C. indicate a composition which may become tacky and blocking when not intended, while melting points above 140° C. would possibly degrade the carrier during coating and oven drying and would certainly increase the thermal energy requirement to transfer the composition to the intended substrate.

B. Pigments

Pigments useful in the invention may be organic or inorganic. Suitable inorganic pigments include carbon black and titania ($TiO_2$), while suitable organic pigment include phthalocyanines, anthraquinones, perylenes, carbazoles, monoazo- and diazobenzimidazolone, isoindolinones, monoazonaphthol, diarylidepyrazolone, rhodamine, indigoid, quinacridone, disazopyranthrone, dinitraniline, pyrazolone, dianisidine, pyranthrone, tetrachloroisoindolinone, dioxazine, monoazoacrylide, anthrapyrimidine. It will be recognized by those skilled in the art that organic pigments may be differently shaded, or even different color, depending on the functional groups attached to the main molecule. However, many of the listed organic pigments have exhibited good weatherability in simulated outdoor use in that they retain much of their initial brightness and color, as exemplified herein below.

Commercial examples of useful organic pigments include those known underthetrade designations PB 1, PB 15, PB 15:1, PB 15:2, PB 15:3, PB 15:4, PB 15:6, PB 16, PB 24, and PB 60 (blue pigments); PB 5, PB 23, and PB 25 (brown pigments); PY 3, PY 14, PY 16, PY 17, PY 24, PY 65, PY 73, PY 74, PY 83, PY 95, PY 97, PY 108, PY 109, PY 110, PY 113, PY 128, PY 129, PY 138, PY 139, PY 150, PY 154, PY 156, and PY 175 (yellow pigments); PG 1, PG 7, PG 10, and PG 36 (green pigments); PO 5, PO 15, PO 16, PO 31, PO 34, PO 36, PO 43, PO 48, PO 51, PO 60, and PO 61 (orange pigments); PR 4, PR 5, PR 7, PR 9, PR 22, PR 23, PR 48, PR 48:2, PR 49, PR 112, PR 122, PR 123, PR149, PR 166, PR 168, PR 170, PR 177, PR 179, PR 190, PR 202, PR 206, PR 207, and PR 224 (red); PV 19, PV 23, PV 37, PV 32, and PV 42 (violet pigments); and PBLACK (black), several of which are available from Heucotech, Fairless Hills, Pa. as aqueous dispersions under the trade designation AQUIS II. Other useful commercially available aqueous pigment dispersions include those known under the trade designations AQUALOR (available from Penn Color Inc, Doylestown, Pa.; MICORLITH-WA (available from CIBA-GEIGY Corporation, Pigments Division, Oak Brook, Ill.); SUNSPERSE, FLEXIVERSE, and AQUATONE (available from Sun Chemical Corporation, Dispersions Division, Amelia, Ohio; and HEUCOSPERSE III (available from Heucotech LTD, Fairless Hills, Pa.).

II. Thermal Mass Transfer Donor Elements

The thermal transfer donor element constructions of the present invention comprise a thermally mass transferable colorant layer comprising a dried version of a coatable composition of the invention coated onto a carrier. FIG. 1 illustrates such a donor element 100, having colorant layer 12 coated onto a carrier 14, in this embodiment a thin (4.5 micrometer thick) polyethylene terephthalate (PET) film. An optional anti-stick/release coating 16 is also illustrated.

Suitable carrier materials for the thermal mass transfer donor element may be any flexible material to which a transparent dried colorant composition or opaque white/metallic pigment layer may be adhered. Suitable carriers may be smooth or rough, transparent or opaque, and continuous (or sheet-like). They are preferably essentially non-porous. Non-limiting examples of materials that are suitable for use as a carrier include polyesters, especially PET, polyethylene naphthalate, polysulfones, polystyrenes, polycarbonates, polyimides, polyamides, cellulose esters, such as cellulose acetate and cellulose butyrate, polyvinyl chlorides and derivatives, and the like. The substrate generally has a thickness of 1 to 500 micrometers, preferably 2 to 100 micrometers, more preferably 3 to 10 micrometers. Particularly preferred carriers are white-filled or transparent PET or opaque paper.

By "non-porous" in the description of the invention it is meant that ink, paints and other liquid coloring media or anti-stick compositions will not readily flow through the carrier (e.g., less than 0.05 ml per second at 7 torr applied vacuum, preferably less than 0.02 ml per second at 7 torr applied vacuum).

In a preferred embodiment an anti-stick/release coating is applied to the back side of the donor element (i.e., the side opposite the thermally transferable colorant layer) to improve handling characteristics of the donor element, reduce friction, and prevent the donor element from sticking to the print substrate. Suitable anti-stick/release materials include, but are not limited to, silicone materials including poly(lower alkyl)siloxanes such as polydimethylsiloxane and silicone-urea copolymers, and perfluorinated compounds such as perfluoropolyethers.

The thermal mass transfer donor elements of the invention are suitable for image production in desktop publishing, direct digital non-critical color proofing, short and long run sign manufacture, and so forth, especially when the graphic image is intended to be weatherable and durable. As used herein the terms durable and durability refer to characteristics such as solvent and chemical resistance, abrasion resistance, bond maintenance of the thermal mass transfer composition to the substrate, and maintenance of color brightness and (for retroreflective substrates) retroreflective brightness. The terms weatherable and weatherability refer to the characteristics such as maintenance of retroreflective brightness, resistant to dirt, resistance to yellowing and the like, all of these in normal use conditions in the outdoors, where sunlight, temperature, and other environmental parameters may affect performance.

In formulating the coatable, film-forming compositions of the invention, it is important that the pigment particles remain unagglomerated to produce transparent colored images. One method, detailed in the examples, utilizes a ball mill. A more preferred method is to formulate the coatable, film-forming compositions of the invention in the following manner. To formulate a 10 percent solids composition (in a diluent consisting of 1:1 weight ratio of deionized water/methanol) of a 1:1:4 weight ratio composition of (1) the pigment dispersion known under the trade designation PB 15:3; (2) the acrylic latex known under the trade designation CARBOSET 514H; and (3) the polyethylene emulsion known under the trade designation POLYEMULSION AC 330 N35, one proceeds by first adding the pigment dispersion under moderate mixing conditions to a flask, followed by the addition of the deionized water. With continued moderate stirring, the methanol is introduced, followed by the acrylic dispersion and then the polyethylene emulsion. If the proper order of addition is followed, no "shocking" or agglomeration of the pigment occurs, so that ball milling is unnecessary. Changing solvents from ethanol to methanol prevents less viscosity build in the composition (ethanol causes swelling of the polymers making it difficult to coat the composition onto the desired carrier).

Coating of the coatable, film-forming thermal mass transfer precursor compositions of the invention onto the carrier may be accomplished by many standard web coating techniques such as imprint gravure, single or double slot extrusion coating, and the like. Imprint gravure is particularly useful for patch-type coatings in which there are interspersed regions of opaque white or metal colorants on a ribbon or sheet.

m. Signage Articles

The donor elements of the present invention are generally used in thermal mass transfer printing by contacting the transferable colorant layer of the inventive donor element or ribbon with a receptor sheet or film (i.e. a substrate) such that the thermally transferable colorant layer is in contact with the receptor sheet. Heat is applied, either from a thermal stylus or an infrared heat source such as an infrared laser or a heat lamp and the donor layer is transferred to the receptor. The heat may be applied to the back of either the donor ribbon or receptor sheet or may be directly introduced to a transferable donor layer.

Particularly preferred substrates are retroreflective sheetings, such as those known under the trade designation SCOTCHLITE, particularly the 3700, 4200, and 5300 series (all enclosed lens type retroreflective). Enclosed-lens retroreflective sheetings are disclosed in U.S. Pat. No. 2,407,680, incorporated herein by reference. Also useful retroreflective substrates are encapsulated-lens sheetings disclosed in U.S. Pat. Nos. 3,190,178; 4,025,159; 4,896,943; 5,064,272; and 5,066,098, all incorporated herein by reference, and cube corner retroreflective sheeting, such as those disclosed in U.S. Pat. Nos. 3,648,348; 4,801,193; 4,895,428; and 4,938,563, all incorporated herein by reference.

Figure 2:
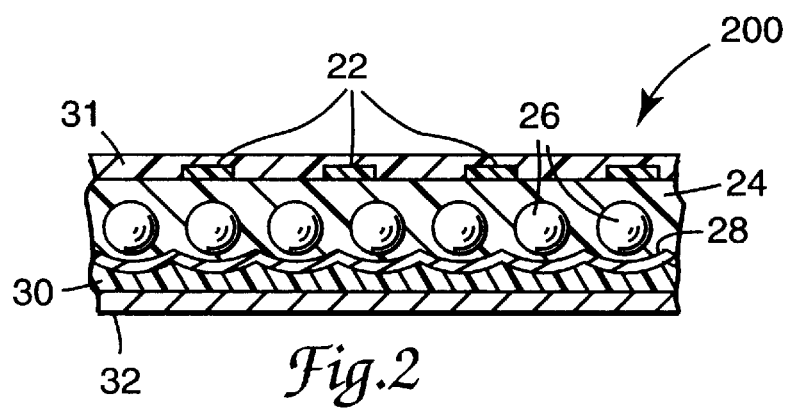
FIG. 2 is a cross-sectional view (enlarged) of an illustrative retroreflective signage article in accordance with the present invention.

FIG. 2 illustrates in enlarged cross section an illustrative retroreflective signage article embodiment 200 in accordance with the invention, comprising thermal mass transfer composition 22 in the form of desired alpha-numeric indicia, bar codes, logos and the like, a polyvinyl butyral layer 24 in which a plurality of transparent glass microspheres 26 are embedded. Other organic layers, such as glyptal, alkyd, ethylene and/or propylene acrylic acid copolymers, ethylene methacrylic acid copolymer, ionomers, crosslinked and/or uncrosslinked aliphatic polyurethanes, vinyl, PMMA, and the like may also comprise layer 24. A cover material 31 is illustrated over the printed indicia for abrasion resistance, chemical deterioration resistance, and the like, which would be desired by users of the inventive articles in prolonged (i.e. greater than 1 year) outdoor usage, such as license plates, highway signs, street signs, and the like. A reflective layer 28, pressure-sensitive adhesive layer 30, and removable liner 32 complete the structure.

Figure 3:
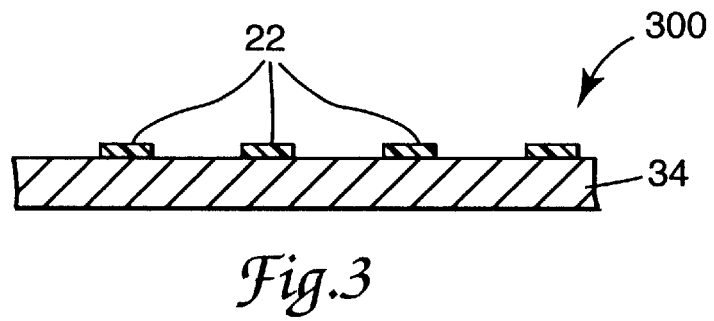
FIG. 3 is a cross-sectional view (enlarged) of an illustrative paper signage article in accordance with the present invention.

FIG. 3 illustrates in enlarged cross section another illustrative signage article embodiment 300 in accordance with the invention, comprising thermal mass transfer composition 22 in the form of desired alpha-numeric indicia, bar codes, logos and the like, adhered to a non-retroreflective, flexible substrate 34. Suitable non-reflective substrates include, vinyl film, paper having a coating of ethylene/acrylic acid copolymer, and thermoplastic resin coated PET for overhead transparency use.

The following test methods and examples further illustrate the present invention but should not be considered limiting.

TEST METHODS

Accelerated Weatherometer Testing

To simulate real world outdoor exposure conditions to evaluate the brightness retention and color change of thermal mass transfer printed retroreflective sheeting made in accordance with the invention, test articles were inserted in an accelerated weatherometer which employed a water cooled xenon arc light source. The weatherometer was a model 65XWWR or CI 65, available from Atlas Electric Devices Co., and the procedures of ASTM G-26 Type B, BH were followed, test designation 3 - 1. The weatherometer used a test cycle which consisted of alternating periods of 102 minutes of light at 63° C. black panel temperature, then 18 minutes light plus water spray. A 6500 watt xenon lamp was employed, having a irradiance of 0.35 W/m$^2$ at 340 nanometers wavelength, which provides a good laboratory simulation of terrestrial sunlight.

Initial Brightness and Brightness Retention

The brightness of the articles was measured at the start and at the end of the exposure periods (500 and 1000 hours) with a retroluminometer as described in U.S. Defensive Publication T987,003 at an observation angle of 0.2° and an entrance angle of −4.0°.

Color Retention

L*a*b* Scan Color Matching Test

Since color is the first stimulus that the consumer perceives, resulting in an immediate evaluation of print quality, color consistency is one of the principal quality attributes of thermal mass transfer printed matter. To determine the color change of the thermal mass transfer compositions of the invention after a certain accelerated weatherometer time duration, a spectrophotometer known under the trade designation SPECTROPLUS C.A.T., available from Color and Appearance Technology Co., Princeton, N.J. was used.

The spectrophotometer is designed to measure the reflectance color of objects. The spectrophotometer measuring geometry used was 0°/45°. This geometry provided for viewing the samples similar to normal visual evaluation, with 0° illumination, or perpendicular illumination of the sample, in 45° viewing of the sample. 45° circumferential viewing effectively excludes the specular (glossy) reflectance. This geometry essentially eliminated the effect of the sample directionality or print texture.

The spectrophotometer used operates essentially as follows. Light from a halogen lamp passes through a series of filters and lenses to simulate D65 daylight and eliminate heat, and is focused on the sample in a circular pattern. (Print color was read in "Illuminant D65", which represents daylight with a correlated color temperature of approximately 6500° Kelvin.) Light diffusely reflected from the sample is collected 45° to the sample by a series of independent photodetectors stationed at various points around the sample, each photodetector sensing a different wavelength band. The information from each photodetector is then fed to a personal computer via an analog-to-digital converter. The computer processes measurement data at 10 nanometer intervals across the visual spectrum, from 400 to 700 nanometers.

For the color determination tests, the 10° CIE Standard Observer was used. (CIE stands for the Commission International de l'Eclairage, an international commission on illumination). The "Standard Observer" is the spectral response characteristic of the average observer defined by the CIE. Two such sets of data are defined, the 1931 data for the 2° visual field (distance viewing) and the 1964 data for the annular 10° visual field (approximately arms length viewing). A much better agreement with the average visual assessment can be obtained by making use of the 10° standard observer, and thus this was the observer used in these tests.

For each color of sample tested, a sample was scanned by the spectrophotometer. This scan produced a numerical description of the colored sample, a fingerprint, which never changes. However, since it does not consider the lighting condition and the observer, the CIE L*a*b* does not completely describe the visual appearance of the color. A mathematical means of translating fingerprints into a set of three numbers (XYZ), tristimulus values, was developed. The tristimulus values describe color as a normal observer sees it under a specific lighting condition.

Because the tristimulus values (XYZ) do not provide either uniform or logical estimates of perceived color intervals or color relationships, scales based on the CIE standard observer were transformed into the "opponent-colors" theory of color vision. The 1976 CIE L*a*b* is one such transformation. The opponent-colors theory maintains that the interaction between the eye and the brain decodes the experience of a color into three specific signals. One of these signals is lightness-darkness (L*), one is red-green (a*) and one is yellow-blue (b*). This color system was chosen for use in these tests because it is believed to be understandable by both the color scientist and the novice. Thus all instrument color readings were taken on a SPECTROPLUS C.A.T. spectrophotometer, in Illuminant D65, with 10° observer, in 1976 CIE L*a*b* color space.

Each sample tested was placed into the instrument sample port. Two complete spectrophotometer readings (scans) were taken, completely emptying and repeating the layout procedure each time. The procedure was repeated until two readings consistent with each other to within less than 0.3 unit range were obtained. If not, the procedures were repeated with more attention to detail. All samples presented to the spectrophotometer for color difference determination were at ambient temperature. The samples were in all cases read within four hours of printing. (Samples left in an uncontrolled condition may exhibit unwanted changes, and samples that have been left standing for a long period of time are not acceptable for spectrophotometer readings.)

In interpreting the results from the spectrophotometer, the opponent-color scales give measurements of color in units of approximate visual uniformity throughout the color space. L* measures lightness and varies from 100 for perfect white, to zero for black, approximately as the eye would evaluate it. a* and b*, the chromaticity dimensions, give understandable designations of color as follows: a* measures redness when plus, gray when zero, and greenest when minus; and b* measures yellowness when plus, gray when zero, and blueness when minus. Color change in the Examples herein is reported as ΔE*, which is defined as:

$$\Delta E^* = [(\Delta L^*)^2 + (\Delta a^*)^2 + (\Delta b^*)^2]^{1/2},$$

where it is preferred that ΔE* be as low as possible, preferably no more than 10 after 500 hours of weatherometer exposure, particularly preferably no more than 5 after 500 hours of weatherometer exposure.

The data for all Tables I–IV employed the thermal mass transfer composition and donor element described in Example I printed onto a retroreflective sheeting known under the trade designation 3M SCOTCHLITE Reflective License Plate Sheeting, product series 3750, which was an enclosed-lens retroreflective sheeting consisting of a polyvinyl butyral binder layer in which glass beads are completely embedded, an aluminum reflective layer, a PSA layer and a paper liner. In all of the Examples (Tables I–IV), block images were thermal mass transfer printed onto the exposed binder of the retroreflective sheeting using a Zebra 140 thermal mass transfer printer, available from Zebra Technologies Corp., Chicago, Ill. The data for Tables I and III were generated with a glass cover layer over the printed indicia, while the data for Tables II and IV were generated with the printed indicia having a polymethylmethacrylate (PMMA) cover layer, 0.003 inch (0.076 mm) thick.

Articles were tested in duplicate for both the brightness and color change tests. Percent retention of brightness was determined for each sample by dividing the end values by the start values and multiplying the result by 100.

EXAMPLES

In Examples I, II, and III which follow, the thermal mass transfer donor elements all consisted of a colored thermal mass transfer composition of the invention adhered to a 4.5 micrometer thick PET film having an anti-stick coating on its backside. The PET film having anti-stick coating was obtained from Toray Chemical Co., Japan. Except where indicated the thermal mass transfer composition was derived from an aqueous coatable composition of the invention comprising a waterborne acrylic dispersion obtained from BFGoodrich, Cleveland, Ohio, known under the trade designation CARBOSET 514H, a polyethylene emulsion known under the trade designation POLYEMULSION 330 N35 obtained from Chemical Corporation of America, and at least one aqueous surfactant-based pigment dispersion from Heucotech known under the trade designation AQUIS II, as detailed in each example. The coatable compositions were ball milled for at least 24 hours before they were coated to decrease the particle size to much less than 1 micrometer and thus increase the light transparency of the printed compositions. The coatable compositions were coated onto the polyester film by a wire wound bar (other methods to deposit thin films (such as gravure printing, flexographic printing, and the like may be used) and dried at elevated temperature of 80° C. for 1 minute. The resulting coated carrier film was spliced into a color proofing donor element used in a color proofing machine known under the trade designation RAINBOW DESKTOP COLOR PROOFER, available from 3M. In Examples I, II, and III the donor element was placed into the proofer and an image was thermal mass transfer printed onto a retroreflective sheeting precursor composed of glass beads fully embedded in polyvinyl butyral binder. Resolution was greater than 200 dots per inch (dpi), which indicated the adhesion to the retroreflective sheeting was good.

Example I

A coatable composition of the invention was prepared as above described using the pigment dispersion known under the trade designation Pigment Blue 15:3 dispersed in an aqueous surfactant stabilized dispersion from Heubach (also known under the trade designation AQUIS II BW 3571: 45% pigment, 51% solids). The composition comprised a 1:1:4 weight ratio of PB 15:3 dispersion/514H/330 N35 (10% solids in 1:1 weight ratio ethanol/deionized water). The coatable composition of the invention was coated onto the Toray 4.5 micrometer thick polyester film with a #20 wire would bar to produce a 3.3 micrometer thick thermal mass transfer composition layer (colorant layer). The film was spliced into the proofer donor element and the thermal mass transfer composition of the invention thermally mass transferred to the polyvinyl butyral top film. The colorant layer showed good adhesion to the polyvinyl butyral retroreflective sheeting precursor film and excellent transparency as defined by the following relationship:

Transparency $\log_{10}(I_o/I_s)$ wherein $I_o$ is the original light intensity and $I_s$ is the scattered light intensity, and wherein the higher the value of the logarithm, the better the transparency.

As a comparison of the transparency and transmission optical density (TOD) of thermally mass transferred compositions of the invention with a known composition, three commercially available waxed-based thermal transfer ribbons available from Calcomp, Co., a Sanders Corp., of Anaheim, Calif., were used to transfer a block of color to a PET film. Table A compares TOD (measured using a MacBeth TR927 densitometer) and transparency (measured using a MacBeth RD918 analyzer) for the comparative images with images produced using the ribbons of Example I.

The data of Table A illustrate that although the images produced using the inventive compositions and thermal transfer articles have greater transmission optical density (TOD) than the comparative example, the inventive thermally mass transferred compositions exhibited greater transparency, an unexpectedly good result.

TABLE A

| Thermal | Calcomp | | Invention | |
| --- | --- | --- | --- | --- |
| Transfer Colorant | TOD | Transparency | TOD | Transparency |
| yellow | 0.40 | 1.07 | 0.85 | 1.60 |
| magenta | 0.53 | 1.51 | 0.85 | 1.69 |
| cyan | 0.81 | 1.39 | 2.73 | 1.93 |

Example II

Example I was repeated with the following exceptions: a polyalkylene-like binder precursor consisting of i) an ethylene acrylic acid (EAA) copolymer dispersion known under the trade designation 50T4983 from Morton International (25% solids) and ii) a polymerized version of stearyl methacrylate hexane diol diacrylate (SMA-HDDA), obtained as an aqueous dispersion from 3M, was used instead of the polyethylene dispersion; and the acrylic dispersion known under the trade designation CARBOSET XL-11 from BFGoodrich was used rather than the CARBOSET 514H.

The following coatable composition was coated onto a new piece of the same polyester carrier used in Example I using a #18 wire wound bar to produce a 3 micrometer thick thermal mass transfer composition layer (colorant layer): a 1:1 weight ratio of compositions (a) and (b), wherein a) 1:1 weight ratio PB 15:3 dispersion/50T4983 (10% solids in a 4:1 weight ratio of ethanol/deionized water +1 weight percent $NH_4OH$), and b) 1:1 weight ratio SMA-HDDA (10% solids in deionized water/XL 11 (10% solids in a 4:1 weight ratio ethanol/deionized water)). The film was spliced into the donor element used in the same color proofing machine used in Example I, and the thermal mass transfer composition of the invention thermally mass transferred to the polyvinyl butyral top film. The colorant layer showed good adhesion to the polyvinyl butyral retroreflective sheeting precursor film and excellent transparency.

Example III (Four Color Imaging on Retroreflective Sheeting)

The retroreflective sheeting, acrylic dispersion, and polyethylene dispersion of Example I were used in preparing the following four coatable compositions of the invention in the following proportions at a 10 weight percent solids in a 1:1 weight ratio of ethanol/deionized water.

Color: Yellow
Pigment used: AQUIS II PY 150, also known as YW 3338, a 35 weight percent solids pigment
Coatable composition: 1:1:4 weight ratio of PY 150 dispersion/CARBOSET 514H/POLYEMUSION 330 N35

Color: Magenta
Pigment used: AQUIS II PR 122, also known as RW 3115
Coatable Composition: 1: 1:4 weight ratio of PR 122/ CARBOSET 514H/POLYEMULSION 330 N35

Color: Cyan
Pigment used: AQUIS II PB 15:3, also known as BW 3571
Coatable composition: 1:1:4 weight percent PB 15:3/ CARBOSET 514H/POLYEMULSION 330 N35

Color: Black
Pigment used: AQUIS II PIGMENT BLACK (also known as KW 3750, a 55 weight percent solids composition)

Coatable composition: 1:1:4PIGMENTBLACK/CARBOSET 514H/POLYEMULSION 330 N35

Each coatable composition was coated onto a separate 4.5 micrometer thick PET film having an antistick coating (Toray) using a #20 wire wound bar to produce a thermal mass transfer layer (colorant layer) having a thickness of 3.3 micrometers. Each coated carrier film was spliced into the proofing donor element used in the proofer described in Example I, each in its appropriate spot. An image was prepared in such a way that anytime colorant was transferred it was transferred at 100% energy because the proofing machine was not designed for thermal mass transfer. This limited the number of colors able to be printed to red, magenta, blue, cyan, green, yellow, and black. Printing using a dot growth technique would no doubt produce more varied colors.

Accelerated Weatherometer Test Results: Brightness and Color Change

As mentioned previously, the coatable composition of Example I was prepared with various pigments, separate thermal mass transfer donor elements formed on separate pieces of the Toray PET film carrier, and the thermal mass transfer compositions of the invention thermal mass transferred as a block of color to separate pieces of retroreflective sheeting known under the trade designation 3M SCOTCHLITE Reflective License Plate Sheeting, product series 3750, from 3M. The colored sheetings were then subjected to the accelerated weatherometer test and the brightness retention and color change measured after 500 and, in some examples, 1000 hours. This data is presented in Tables I–IV; in Tables I and II, the designation $\Delta E^*$ denotes the color change as in the test described above, while in Tables III and IV the designation "CPL" denotes candelas per lux per square meter which is a measure of brightness. As can be seen from the data, the brightness retention was excellent in all the samples (except the black pigments, in which brightness is not a concern), and color change was minimal or within acceptable values. Brightness retention is preferably at least 50 percent after 500 hours accelerated weatherometer testing, more preferably at least 75 percent after 1000 hours of accelerated weatherometer testing.

Various modifications and alterations of this invention will become apparent to those skilled in the art without departing from the scope thereof It should be understood, therefore, that the scope of this invention is not to be limited to the illustrative embodiments set forth herein, but is to be determined by the limitations set forth in the claims and equivalents thereof.

TABLE I (Color Change - Images Covered by Glass)

| PIGMENT | EXAMPLE | Exposure Time (Hr) | Color Change ($\Delta E^*$) |
|---|---|---|---|
| PB 15:3 | 1A | 500 | 2.03 |
|  | 1B | 500 | 4.54 |
|  | 1A | 1000 | 2.66 |
| PY 150 | 2A | 500 | 3.93 |
|  | 2B | 500 | 4.54 |
|  | 2A | 1000 | 2.66 |
| PR 122 | 3A | 500 | 3.44 |
|  | 3B | 500 | 4.38 |
|  | 3A | 1000 | 3.68 |
| PBLACK | 4A | 500 | 2.3 |
|  | 4B | 500 | 0.88 |
|  | 4A | 1000 | 0.74 |

TABLE II (Color Change - Image Covered by PMMA Film)

| PIGMENT | EXAMPLE | Exposure Time (Hr) | Color Change ($\Delta E^*$) |
|---|---|---|---|
| PB 15:3 | 1A | 500 | 1.22 |
|  | 1B | 500 | 1.30 |
|  | 1A | 1000 | 2.30 |
| PY 150 | 2A | 500 | 3.66 |
|  | 2B | 500 | 3.73 |
|  | 2A | 1000 | 3.43 |
| PR 122 | 3A | 500 | 1.88 |
|  | 3B | 500 | 2.27 |
|  | 3A | 1000 | 3.09 |
| PBLACK | 4A | 500 | 1.29 |
|  | 4B | 500 | 0.64 |
|  | 4A | 1000 | 1.10 |

TABLE III (Brightness Retention-Images Covered by Glass)

| PIGMENT | EXAMPLE | ORIGINAL BRIGHTNESS (CPL) | Exposure Time (Hr) | FINAL BRIGHTNESS (CPL) | % BRIGHTNESS RETENTION |
|---|---|---|---|---|---|
| PB 15:3 | 1 | 16 | — | — | — |
|  | 1A | — | 500 | 15 | 93 |
|  | 1B | — | 500 | 17 | 108 |
|  | 1A | — | 1000 | 14 | 87 |
| PY 150 | 2 | 60 | — | — | — |
|  | 2A | — | 500 | 58 | 97 |
|  | 2B | — | 500 | 56 | 94 |
|  | 2A | — | 1000 | 54 | 90 |
| PR 122 | 3 | 20 | — | — | — |
|  | 3A | — | 500 | 24 | 121 |
|  | 3B | — | 500 | 24 | 121 |
|  | 3A | — | 1000 | 22 | 110 |

TABLE IV (Brightness Retention-Images Covered by PMMA Film)

| PIGMENT | EXAMPLE | ORIGINAL BRIGHTNESS (CPL) | Exposure Time (Hr) | FINAL BRIGHTNESS (CPL) | % BRIGHTNESS RETENTION |
|---|---|---|---|---|---|
| PB 15:3 | 5 | 12.9 | — | — | — |
|  | 5A | — | 500 | 14.3 | 111 |
|  | 5B | — | 500 | 13.3 | 103 |
|  | 5A | — | 1000 | 14.5 | 112 |
| PY 150 | 6 | 55 | — | — | — |
|  | 6A | — | 500 | 53.8 | 98 |
|  | 6B | — | 500 | 55 | 100 |
|  | 6A | — | 1000 | 53 | 96 |
| PR 122 | 7 | 26.4 | — | — | — |
|  | 7A | — | 500 | 24 | 91 |
| PB 15:3 | 5 | 12.9 | — | — | — |
|  | 5A | — | 500 | 14.3 | 111 |
|  | 5B | — | 500 | 13.3 | 103 |
|  | 5A | — | 1000 | 14.5 | 112 |
|  | 7B | — | 500 | 24.3 | 92 |
|  | 7A | — | 1000 | 24.2 | 92 |

What is claimed is:

1. A signage article comprising a thermal mass transfer composition in the form of indicia adhered to a retroreflective sheeting, the thermal mass transfer composition comprising:
   a) an aliphatic polyalkylene binder;

b) an aliphatic acrylic binder that is a polymer or copolymer formed from acrylic or methacrylic acid, wherein the polyalkylene binder and acrylic binder are present at a weight ratio of polyalkylene binder to acrylic binder ranging from about 1.5:1.0 to about 15:1.0; and c) an effective amount of a pigment to provide the desired color to a thermal mass transfer composition;

wherein the pigment and the acrylic binder are present at a weight ratio of pigment to acrylic binder ranging from about 0.5:1.0 to about 1.5:1.0, and the polyalkylene binder is present in an amount sufficient to provide the desired UV and visible light transparency and gloss to the thermal mass transfer composition.

2. Signage article in accordance with claim 1 wherein the retroreflective sheeting comprises a polyvinyl butyral layer, and the indicia is adhered thereto.

3. Signage article in accordance with claim 1 wherein the signage article is outdoor durable and weatherable.

4. Signage article in accordance with claim 1 further comprising a transparent cover material layer over the thermal mass transfer composition.

5. Signage article in accordance with claim 1 wherein the thermal mass transfer composition has a thickness ranging from about 1 to about 10 micrometers.

6. Signage article in accordance with claim 1 wherein the thermal mass transfer composition has a thickness ranging from about 2 to about 8 micrometers.

7. Signage article in accordance with claim 1 wherein the thermal mass transfer composition has a thickness ranging from about 3 to about 6 micrometers.

8. Signage article in accordance with claim 1 wherein the article exhibits a protected color change defined by $\Delta E^*$ less than or equal to about 5 after weatherometer exposure to 500 hours.

9. Signage article in accordance with claim 1 wherein the article exhibits a protected brightness retention of at least 50 percent after accelerated weatherometer exposure for 500 hours.

10. Signage article in accordance with claim 1 wherein the article exhibits a protected brightness retention of at least 75 percent after accelerated weatherometer exposure for 1000 hours.

* * * * *

UNITED STATES PATENT AND TRADEMARK OFFICE
CERTIFICATE OF CORRECTION

PATENT NO. : 6,190,757 B1
DATED : February 20, 2001
INVENTOR(S) : Lisa Flatt Nelson, Hsin-Hsin Chou and Christopher E. Kunze It is certified that error appears in the above-identified patent and that said Letters Patent is hereby corrected as shown below:

Column 6,
Line 2, "underthetrade" should be -- under the trade --.

Column 7,
Line 49, "m. Signage Articles" should be -III. Signage Articles --.

Column 8,
Line 48, "3-1" should be -- 3-1 --.

Column 11,
Line 46, "$\log_{10}$" should be -- $\infty \log_{10}$ --.

Column 12,
Line 57, "1: 1:4" should read -- 1:1:4 --.

Column 13,
Line 1, "1:1:4PIGMENTBLACK" should be -- 1:1:4 PIGMENT BLACK --.
Line 45, "thereof" should be -- thereof. --.

Column 16,
Line 10, "AE*" should be -- $\Delta$E* --.

Signed and Sealed this

Fourth Day of December, 2001

*Attest:*

*Attesting Officer*

NICHOLAS P. GODICI
*Acting Director of the United States Patent and Trademark Office*